May 13, 1924.
B. S. HARRISON
METHOD OF DRYING MATERIALS
Original Filed Dec. 4, 1918
1,493,778
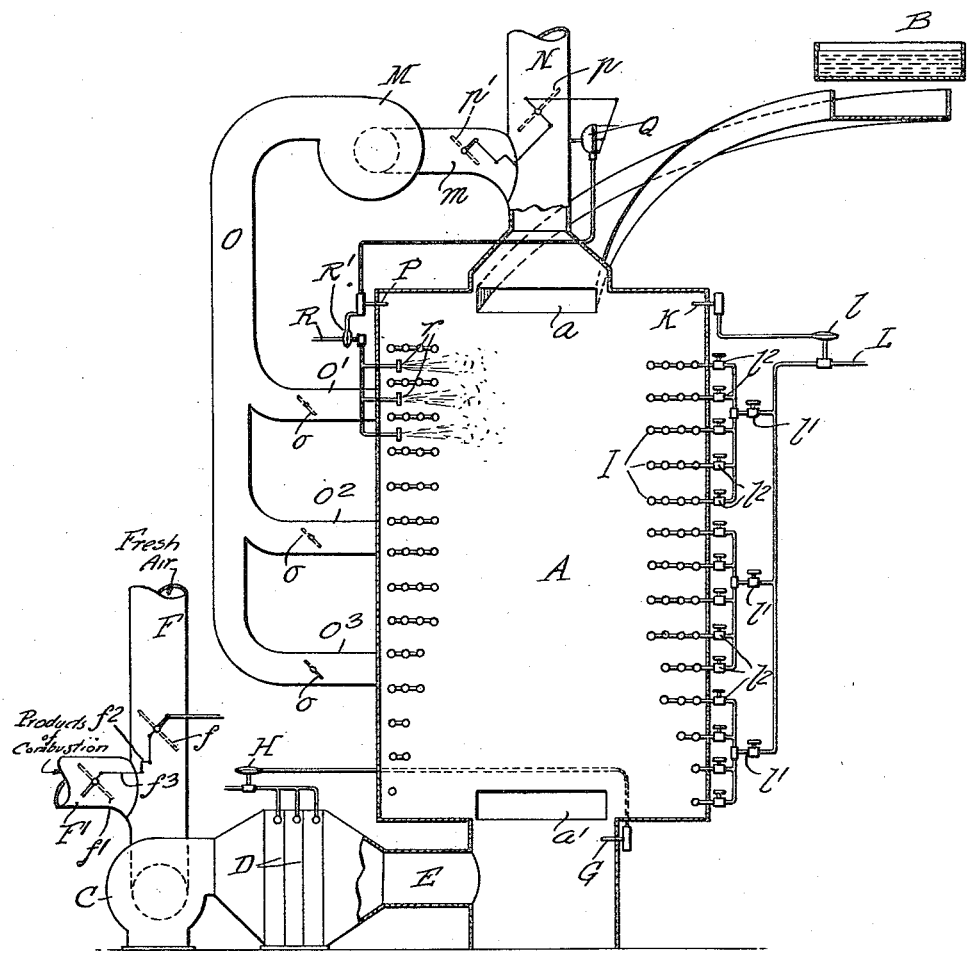
INVENTOR.
Burt S. Harrison
by Parker & Machunas
his ATTORNEYS.

Patented May 13, 1924.

1,493,778

UNITED STATES PATENT OFFICE.

BURT S. HARRISON, OF CHICAGO, ILLINOIS, ASSIGNOR TO CARRIER ENGINEERING CORPORATION, OF NEWARK, NEW JERSEY.

METHOD OF DRYING MATERIALS.

Original application filed December 4, 1918, Serial No. 265,264. Divided and this application filed February 20, 1922. Serial No. 537,801.

*To all whom it may concern:*

Be it known that I, BURT S. HARRISON, a citizen of the United States, residing at Chicago, in the county of Cook and State of Illinois, have invented a new and useful Improvement in Methods of Drying Materials, of which the following is a specification.

This invention relates more particularly to a method of drying materials, such as peeled or sliced vegetables and fruits which oxidize from exposure to the atmosphere, this application being a division of my copending application, Serial No. 265,264, filed December 4, 1918.

The surfaces of some peeled or sliced vegetables and fruits rapidly become darkly discolored when exposed to the atmosphere, due to the oxidation in the presence of the enzymes. In drying processes heretofore practiced, it has been customary to blanch or parboil such sliced or peeled vegetables or fruits before putting them in the drier, in order to avoid this oxidation with its consequent discoloration. Blanching, however, has objectionable features. In the case of potatoes, for example, it hydrolizes the starch and gelatinizes the cells so that the dried slices have a more or less translucent appearance and have to be soaked for a long period of time before they will regain the water necessary to make them fit for use. If dried too hard, even four to six hours soaking will not restore them to anything like the condition of pliability of the raw sliced potatoes.

The object of the invention is to produce a commercially practical and economical method of drying materials, such as sliced or peeled vegetables and fruits, whereby oxidation and discoloration of the material are prevented, and the dried material will regain water and be restored more nearly to its original condition by soaking in cold water for a much shorter time than is required for fruits or vegetables dried by prior methods.

In drying potatoes, for example, by this method, the sliced potatoes are dipped into or otherwise suitably treated with a weak saline or acid solution, or other medium, which will temporarily protect the exposed surfaces of the potatoes and prevent oxidation or the action of the ferments and enzymes until the potatoes enter the drier. Ordinary table salt or other salts, such for example as magnesium chloride, ammonium chloride, hydrochloric, nitric or sulphuric acid can be used. The potatoes are then put directly into the drier without first blanching or parboiling them and in the drier they are subjected to heated air or gas, the temperature and relative humidity of which are appropriately regulated. The air or gas with which the potatoes are first treated preferably has a temperature of about 160° F., or less, and a relative humidity of from about 20 per cent to about 30 per cent, and the relative humidity of the air, and also the temperature in some cases, are gradually reduced until the potatoes are finished at a temperature of about 140° F. to 150° F. more or less, and a relative humidity of from about 8 per cent to about 15 per cent. The actual temperature in the drier will vary slightly with the vapor pressure of the atmosphere. On a dry day 140° F. more or less, will be sufficient, while on a very humid day a temperature of 160° F. more or less may be necessary. By controlling the humidity in the drier so that the potatoes are first acted upon by the air or gas having a relatively high humidity, the saline or acid solution on the potatoes is prevented from drying off before it completes the action on the juices which are drawn out of the interior portions of the potatoes during the drying process. The surface portions of the potatoes are also thus prevented from drying and hardening before the interior portions, and the juices are drawn out of the interior portions of the potatoes and the potatoes dried uniformly throughout without oxidation or discoloration. If the surface portions of the potatoes and the protective solution thereon were dried before the juices were removed from the interior of the potatoes the juices would cause the objectionable oxidation and discoloration. The method is further explained hereinafter in connection with the description of the apparatus for practicing the method.

The accompanying drawing is a diagrammatic sectional view of an apparatus adapted for carrying out the method claimed.

A represents a chamber or casing in which the sliced or peeled potatoes or other material are dried. The material preferably enters the casing through a suitable opening $a$ in its upper portion and moves gradually downward through the casing, leaving the same through an opening $a'$ in the lower portion of the casing. This invention is not dependent upon the particular construction of the drier or the means for causing the gradual travel of the material through the same and any suitable construction, such for instance as disclosed in Patent No. 1,191,075, granted to me July 11, 1916, can be employed. In said patented drier the material is placed on trays which are introduced into the upper portion of the drier casing and travel slowly downwardly through the same on a spiral track or way. A similar drier is preferably used for practicing the present method. Just before the potatoes or material enter the drier they are treated with the saline or acid solution or protective agent, preferably by passing them through a bath of the solution or agent in a suitable vessel B.

C represents a fan for delivering air or gas to the lower end of the drier casing and D represents steam coils, or a heater of other suitable type, located in the air trunk E for heating the air or gas before it enters the drier. The fan intake or suction pipe preferably has a fresh air branch F and a branch pipe F' which connects with a furnace or other source of gases of combustion and these branches are controlled by dampers $f$ $f'$ respectively adapted to be set so as to enable the use either of fresh air or the gases of combustion, or a suitably proportioned mixture of fresh air and the gases. The dampers can be adjusted by hand or by any suitable mechanism. As shown, they are connected by a lever $f^2$ and links $f^3$ which cause one damper to open as the other closes. The temperature of the entering air or gas is maintained substantially constant by a thermostat G which is located in the the lower portion of the casing and regulates the supply of steam to the air heating coils D, by means of a diaphragm valve H or other suitable device. Within the drier casing and preferably extending from bottom to top thereof, are arranged direct radiation steam coils I. The supply of steam to these coils is regulated by a thermostat K arranged in the upper portion of the drier casing and a diaphragm valve $l$ in the steam supply line L for the coils I. Preferably the coils are arranged in several groups each connected by a valve-controlled pipe $l'$ to the main steam supply line L. The thermostat K can be adjusted so as to maintain an uniform temperature throughout the drier casing or so as to give a gradually increasing temperature from the bottom to the top of the drier. This may be explained as follows:

The natural tendency of the heated air entering the lower part of the chamber A is to rise therein, and together with the heat from the steam coils I, will produce a higher temperature at the top of the chamber than at the bottom. The evaporation of moisture from the moisture laden material entering the top of the chamber causes a reduction in the temperature in the top of the chamber. As the material moves downwardly this effect is gradually lessened, due to the continued lower rate of evaporation, and the material reaches the lower part of the chamber in a dried condition and consequently does not affect the temperature of the entering, heated air. If, therefore, the valves $l'$, $l^2$ be initially set to regulate the coils I so that they will give just the right quantity of heat to restore the heat taken up by the evaporation of the moisture in the material in the upper zones of the chamber, the thermostat K may be adjusted to control the steam supply to the coils I as required, for any predetermined, uniform temperature throughout the chamber.

On the other hand, a gradually increasing temperature from the bottom to the top of the drier casing may be readily provided by adjusting the valves $l'$ $l^2$ of the steam coils so that they will, from the bottom to the top, successively give off an increasing amount of heat in excess of the amount absorbed by evaporation. The thermostat K will, as before, maintain the conditions required through its regulation of the steam supply valve under the control of the temperature required in the top of the chamber and for which it may be set. By arranging the steam coils as shown, in different groups each controlled by a separate valve, and providing each coil of the several groups with a controlling valve $l^2$ a very accurate control of the temperature throughout the drier is made possible.

M represents a recirculating fan which is connected by a suction pipe $m$ with a vent pipe N leading from the upper end of the drier casing. The discharge pipe O of this fan is provided with branches O' O² O³ connected with the drier casing at different elevations and each of these branch pipes is provided with a damper $o$ for regulating the discharge therefrom. This recirculating fan is adapted to draw more or less of the moist air or gas from the upper portion of the casing and return the same in regulated volumes to the casing through the branch pipes O' O² O³ and thereby maintain a desired higher relative humidity in the upper portion of the drier casing than in the lower portion. The relative humidity in the upper portion of the casing is controlled by a hygrostat P which is located in the upper portion of the drier casing and controls the position of the dampers $p$ $p'$ in the vent pipe N and fan suction pipe $m$, the hygrostat for this purpose being operatively connected to a diaphragm or motor Q for operating the valves $p$ $p'$. The motor is suitably connected to the dampers $p$ $p'$ so that as one damper closes the other will open correspondingly. In order to further raise the relative humidity in the upper portion of the casing, when this is necessary, steam nozzles $r$ are arranged to discharge steam into the upper portion of the drier casing. These nozzles are connected to a steam supply pipe R provided with a diaphragm valve R' also controlled by the hygrostat P.

The thermostats G and K and the hygrostat P and the means through which they operate to regulate the temperature of the entering air and the temperature and humidity in the upper portion of the drier can be of any usual or suitable construction adapted to produce the required conditions. Since the invention is not dependent upon any particular construction of these parts they are shown diagrammatically only.

The thermostats G and K and the hygrostat P can be set so as to maintain the conditions of temperature and relative humidity in the drier required by the particular material being dried. For instance, the air or gas in the upper portion of the drier casing can be maintained at a temperature of about 160° F. and at a relative humidity of from about 20 per cent to about 30 per cent, while the relative humidity and temperature gradually decrease toward the lower portion of the casing where the temperature may be from about 140° to about 150° F. and the relative humidity from about 8 per cent to about 15 per cent. Since the material gradually passes downwardly through the drier casing it is thus subjected first to air or gas having the required drying temperature and a sufficiently high humidity to prevent the drying of the solution on the material and the surface portions of the material before the interior portions of the material are properly dried, and the drying of the potatoes or material is then continued in a gradually decreasing temperature until they are finished at the required temperature and humidity.

By the method described, the enzymes are not killed, but are rendered inactive by the preserving effect of the saline or acid solution and the material is dried uniformly throughout without oxidation or discoloration, in a relatively short period of time, usually about three hours. Potatoes thus dried have a white, opaque appearance instead of being translucent or gelatinized and they will regain water and be softened and restored to a condition practically like fresh, raw potatoes and be capable of similar uses by soaking them for only about twenty to thirty minutes in cold water. They lose nothing by the drying process except water and the ferment.

When the vegetables or fruits are treated with a solution of a salt, the dampers $f$ $f'$ are preferably adjusted to supply a suitably proportioned mixture of products of combustion and air to the drier. When using an acid solution, the gases of combustion can be used if desired, but they are not necessary. A solution of ordinary table salt is preferably used in drying fruits and vegetables, because it is not only not objectionable, but is desirable, since salt is ordinarily required anyway in cooking these materials. A dilute solution of, say about one tenth of one per cent of the acids mentioned is not deleterious. Substantially equally good results can also be secured by the use of alum, formalin or other fungicides, but these are objectionable for treating food products.

I claim as my invention:

1. The hereindescribed method of drying material, such as sliced fruits and vegetables, that becomes oxidized by exposure to the atmosphere, consisting in treating the material with an agent that prevents oxidation of the material, then subjecting the material progressively first to heated air having a comparatively high relative humidity and then to heated air having a lower temperature and a lower relative humidity.

2. The hereindescribed method of drying material, such as sliced fruits and vegetables, that becomes oxidized by exposure to the atmosphere, consisting in treating the material with a solution that prevents oxidation of the material, then subjecting the material progressively first to heated air having a comparatively high relative humidity and then to heated air having a lower temperature and a lower relative humidity.

3. The hereindescribed method of drying material, such as sliced fruits and vegetables, that becomes oxidized by exposure to the atmosphere, consisting in treating the material with a weak saline solution that prevents oxidation of the material, then passing the material progressively first through heated air having a comparatively high relative humidity and then through heated air having a lower relative humidity and maintaining said temperature and humidity conditions substantially constant.

4. The hereindescribed method of drying material, such as sliced fruits and vegetables, that becomes oxidized by exposure to the atmosphere, consisting in treating the material with a weak saline solution that prevents oxidation of the material, then subjecting the material progressively first to heated air and products of combustion having a comparatively high relative humidity and then to heated air and products of combustion having a lower relative humidity.

5. The hereindescribed method of drying material, such as sliced fruits and vegetables, that becomes oxidized by exposure to the atmosphere, consisting in treating the material with an agent that prevents oxidation of the material, then passing the material through a current of heated air, and regulating the temperature and humidity of the air so that the material first passes through a zone of air having a comparatively high relative humidity and then through a zone of air having a lower temperature and a lower relative humidity.

6. The hereindescribed method of drying material, such as sliced fruits and vegetables, that becomes oxidized by the exposure to the atmosphere, consisting in treating the material with an agent that prevents oxidation of the material, then passing the material through a current of heated air, and regulating the temperature and humidity of the air so that the material first passes through a zone of air having a comparatively high relative humidity and then through a zone of air having a lower temperature and a lower relative humidity.

7. The hereindescribed method of drying material, such as sliced fruits and vegetables, that becomes oxidized by exposure to the atmosphere, consisting in treating the material with a solution that prevents oxidation of the material, then subjecting the material progressively first to heated air having a temperature not higher than approximately 160° F. and a relative humidity of approximately from 20 per cent to 30 per cent, and then to heated air having a relative humidity of approximately from 8 per cent to 15 per cent and maintaining said temperature and humidity conditions substantially constant.

8. The hereindescribed method of drying material, such as sliced fruits and vegetables, that becomes oxidized by exposure to the atmosphere, consisting in treating the material with a weak saline solution that prevents oxidation of the material, then passing the material progressively first through heated air having a temperature of not higher than approximately 160° F. and a relative humidity of approximately from 20 per cent to 30 per cent, and then through heated air having a relative humidity of approximately from 8 per cent to 15 per cent and maintaining said temperature and humidity conditions substantially constant.

9. The hereindescribed method of drying material, such as sliced fruits and vegetables, that becomes oxidized by exposure to the atmosphere, consisting in treating the material with an agent that prevents oxidation of the material, then passing the material through a current of heated air and products of combustion and regulating the temperature and humidity of the air and products of combustion so that the material is first subjected to air and products of combustion having a temperature not higher than approximately 160° F. and a relative humidity of approximately from 20 per cent to 30 per cent, and then to air and products of combustion having a relative humidity of approximately from 8 per cent to 15 per cent.

10. The hereindescribed method of drying material, such as sliced fruits and vegetables, that becomes oxidized by exposure to the atmosphere, consisting in treating the material with an agent that prevents oxidation of the material, then passing the material downwardly through a drying chamber, causing a current of heated air to ascend through said chamber, maintaining a substantially constant temperature of the entering air, and regulating the humidity so as to maintain a higher relative humidity in the upper portion of said chamber than in the lower portion thereof.

11. The hereindescribed method of drying material such as sliced fruits and vegetables, that becomes oxidized by exposure to the atmosphere, consisting in first treating the material with an agent that prevents oxidation of the material, then subjecting the material progressively first to heated air having a comparatively high relative humidity and thereafter to heated air having a lower relative humidity, and maintaining said temperature and humidity conditions substantially constant.

BURT S. HARRISON.